Feb. 2, 1965 R. C. LA BORDE 3,168,740
IMPULSE RECORDER
Filed Aug. 13, 1962
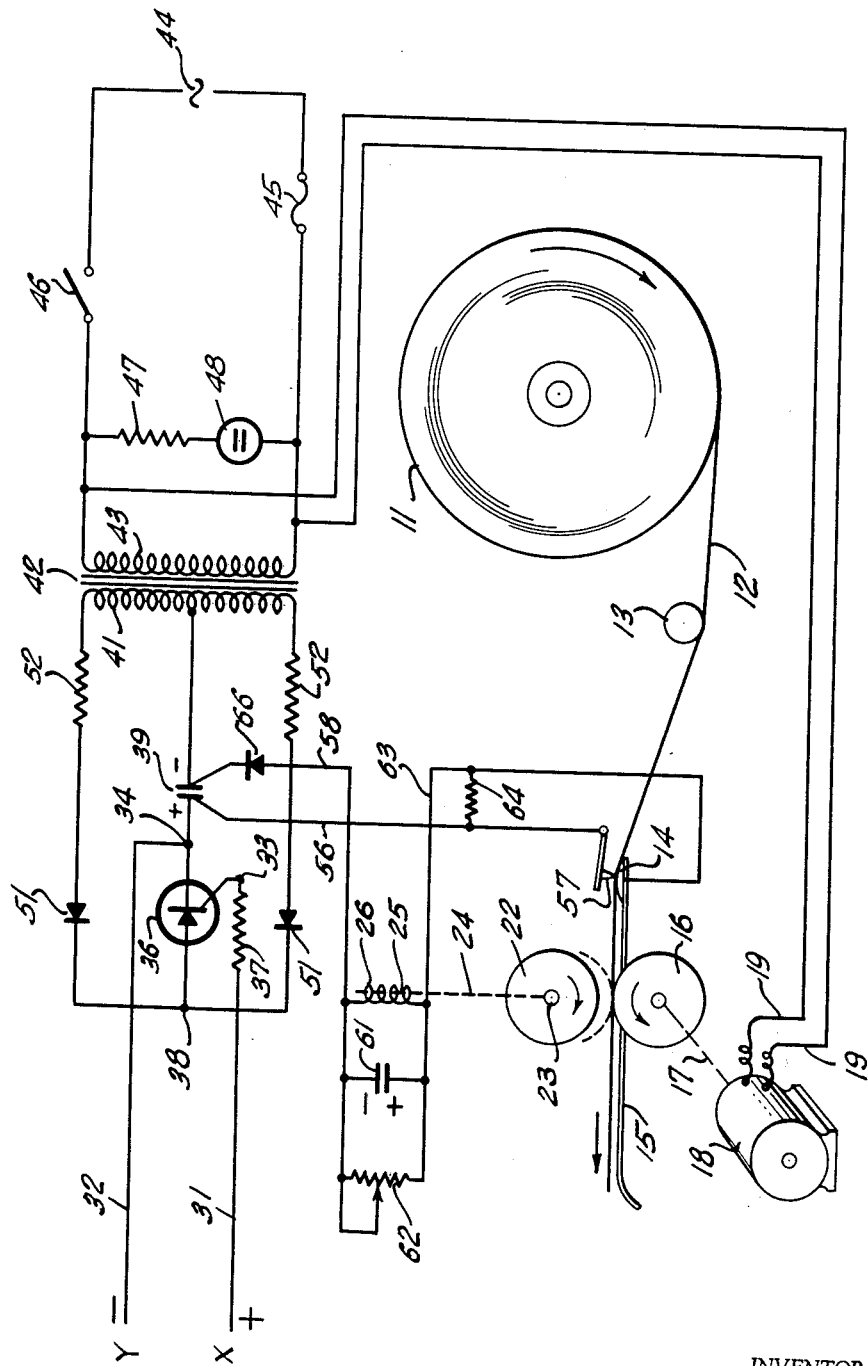
INVENTOR.
ROBERT C. LA BORDE
BY I. Jordan Kunik
ATTORNEY 3,168,740
IMPULSE RECORDER
Robert C. La Borde, Bronxville, N.Y., assignor to Automatic Impulse Recording Corporation, New York, N.Y., a corporation of New York
Filed Aug. 13, 1962, Ser. No. 216,542
15 Claims. (Cl. 346—74)

This invention relates to recording devices, and more particularly to an improved system for receiving and recording pulsed signals.

At present there are various mechanical electro-magnetic pen registers used in conjunction with such signalling systems as fire alarms, burglar alarms, watchman's clocks, messenger call circuits, and in other apparatus and for other purposes where it is necessary to record information transmitted in the form of electrical impulses. Some of these machines provide for recording tape to be transported by means of spring actuated mechanisms which require manual winding from time to time, while the impulses are recorded by a pen which requires periodic inking in order to keep it in functioning order. Since these machines must be in operating condition at all critical times, operating failures due to accident or neglectful servicing cannot be tolerated.

In order to overcome the deficiencies of the prior art devices the present invention includes, as one of its salient features, the provision of means for ensuring the automatic transport of tape substantially simultaneously with the recordation of the input signal pulse or series of signal pulses. A novel solid state circuit is utilized which is activated by the input signal pulse not only to initiate motion of the recording medium, but also to cause the signal pulse itself to be recorded thereon.

A further advantage that is realized by the system of the present invention is the clear recordation of the first pulse of a series of pulses, so that accurate information is made available to the operator. This is in contrast to the deficiencies of prior systems where such first pulses were clipped or not sufficiently clearly recorded, resulting in confusion as to the veracity of the information received.

The system of the present invention which ensures the reliable operation of an unattended instrument, as well as the completeness of the information that is recorded, is shown schematically and diagrammatically in the figure of the drawing.

The device includes a supply reel 11 which contains a supply of electrosensitive tape 12 which records a visible dot or dash where electrical current passes therethrough.

Tape 12 passes around a capstan 13 and across the surface of a base electrode 14 after which it passes above a platform 15. After tape 12 passes base 14 it passes over the perimeter of a continuously rotating drive wheel 16 which is connected by means of a shaft 17 to a small shaded pole fast starting electric motor 18 whose leads 19 are connected to a suitable power supply. The perimeter of continuously rotating drive wheel 16 is only in sliding engagement with, and does not advance, tape 12 until a pressure wheel 22 positioned directly above drive wheel 16 is urged downwardly whereby the perimeters of both wheels grip tape 12 between them and cause the latter to move in the direction of the arrow.

Pressure wheel 22 is freely rotatable on an idler shaft 23 connected to a rod 24 that is normally in a retracted position, whereby the perimeter of said wheel is spaced apart from the perimeter of drive wheel 16. Rod 24 is connected to the armature 25 of solenoid 26 whose operation will be described hereinafter.

The signal input pulses which are to be recorded are received on terminals X and Y, which are, respectively, positive and negative in characteristic. Terminals X and Y are connected by means of lead lines 31 and 32 to the gate terminal 33 and cathode terminal 34, respectively, of a controlled rectifier 36, a semiconductor device which acts as a high current, high voltage, high efficiency switch. Connected between terminal X and gate terminal 33 is a resistor 37 which limits the amount of current passing through said gate terminal. Connected to cathode terminal 34 of rectifier 36 is the positive side of an electrolytic condenser 39, the negative side of which is connected to the center tap of secondary winding 41 of a transformer 42 whose primary winding 43 is connected to a suitable power supply 44.

The power supply circuit includes a fuse 45, a switch 46, and a parallel circuit across the primary winding 43, comprising a resistor 47 in series with a suitable neon bulb 48 which indicates the "on" or "off" condition of the power supply.

Connected to anode terminal 38 of controlled rectifier 36 are the two ends, respectively, of secondary winding 41 of the transformer. In each of the circuits between the secondary winding 41 and anode terminal 38 is a series circuit which includes a diode 51 which keeps negative voltage off the anode of the controlled rectifier while the gate is positive. Connected in each of these series circuits is a suitable limiting resistor 52.

The circuit of the electrolytic condenser 39 comprises a lead line 56 that electrically connects the positive side of said condenser with recording stylus or electrode 57.

The negative side of condenser 39 is connected by way of lead line 58 to one end of a solenoid whose coil 26 surrounds armature 25. Connected across the coil 26 is an electrolytic condenser 61 which performs the function of holding coil 26 in an actuated condition for a predetermined period. The solenoid circuit also includes a variable resistor of potentiometer 62 which may be adjusted to determine the hold time of condenser 61. In order to prevent hold condenser 61 from discharging in the improper direction, diode 66 is connected into lead line 58 between solenoid coil 26 and condenser 39.

The other end of the solenoid circuit is connected by way of lead line 63 to base electrode 14 which is positioned opposite the point of stylus electrode 57, with tape 12 being arranged to pass therebetween.

Connected across leads 56 and 63 is a resistor 64 which completes the electrode circuit across condenser 39. The value of resistor 64 is determined by the respective voltage requirements of the solenoid circuit and the electrode circuit as supplied by condenser 39.

In operation, the application of a signal pulse upon terminals X and Y causes the firing of controlled rectifier 36 whereby electrical energy is instantaneously impressed upon condenser 39 and therethrough simultaneously upon the two circuits served by said condenser, namely, the solenoid circuit and the electrode circuit. The voltage drop across resistor 64 is impressed across the electrodes of the printing circuit, while at the same time solenoid coil 26 is energized to bring about the instantaneous transport of recording medium 12. This is brought about by the movement of armature 25 causing pressure wheel 22 to descend, whereby it operates in conjunction with continuously rotating constant speed drive wheel 16 to move tape 12 in the direction of the arrow. Simultaneously with the motion of the recording tape 12, an electric charge is caused to pass between stylus electrode 57 and base electrode 14, through recording tape 12, which, being sensitized to such electrical impulses, produces a visible dot or other suitable image that constitutes the desired information.

The advantage gained by utilizing the controlled rectifier for the particular purpose outlined hereinbefore is that it performs the dual function of acting both as a rectifier and as a pulsing switch, so that not only is the information passed substantially instantaneously to the recording stylus, but also the switching action is effective in causing the solenoid to become activated to produce the simultaneuos motion of the recording tape. In this manner the input signal itself not only causes its own recordation, but also insures that the tape transport is in motion so that the full information of that impulse is substantially completely recorded.

The advantage gained in utilizing controlled rectifier 36, which, in some embodiments, constitutes a silicon controlled rectifier, is that the voltage drop across said rectifier is considerably less than that which would obtain across other switching elements, such as thyratrons or the like. Accordingly, the controlled rectifier transmits an adequate amount of current for operating the printing circuit comprising the stylus and base electrodes.

One of the several applications of the present system comprises the monitoring of automatic telephone dialling, where each digit is represented by a series of electrical pulses. It is manifest that the accurate recording of the number of pulses is of critical importance, and it is particularly important to obtain a recording of the initial pulse of the initial digit that is dialled. The system described hereinbefore ensures that the first pulse of the first digit that is dialled is recognizably recorded so that all doubt as to the accuracy of the first digit is dispelled.

In the context of recording telephone dialling signals, the function of condenser 61 is to keep coil 26 operative during the entire pulsing sequence of each digit.

The length of the hold time of condenser 61 is regulated by potentiometer 62 to be of such duration as is necessary only to provide a minimum transport of tape between dialled digits so that each series of pulses for each digit will be separated from a subsequent series of pulses representing a following digit.

For example, when a series of numbers, such as "496" is dialled, the dialling of number "4" will start the pulsing circuit in operation, and four dots will be recorded on the moving tape 12. Condenser 61 has sufficient stored energy to maintain coil 26 energized so that a certain minimum amount of tape will pass electrodes 57 and 14 before the next digit "9" is dialled. Then when the digit "9" is dialled, the same sequence of events takes place and is repeated for all subsequent dialling of digits.

Since there is the possibility that a telephone number may be dialled with very long intervals between digits, it is obvious that to keep tape 12 running for commensurate intervals would result in wasted tape. It is only necessary, therefore, to adjust potentiometer 62 to determine the adequate or desired spacing of the tape 12 that is to appear between a series of pulses representing sequential digits.

It is understood that the activation of the transport of tape 12 may be accomplished by mechanical or electromechanical means other than the system shown in the drawing. For example, it is possible to provide for instantaneous motion of tape 12 upon receipt of signal pulses from condenser 39 by means of fast acting clutch devices that are operative in conjunction with shaft 17 of motor 18. In such a case, tape 12 would be maintained under continuous tension by frictional engagement between a drive wheel and a pressure wheel, and the drive wheel would be operated by the fast acting clutch between shaft 17 and motor 18 to initiate and continue the motion of tape 12.

It is claimed:

1. A pulse recording system including a recording medium and a medium transport mechanism, comprising an input for receiving impulse signals, a controlled rectifier connected to said input, a condenser connected to said rectifier, a first circuit connected to said condenser, means in said first circuit for actuating said transport mechanism according as impulses are received on said input, a second circuit connected to said condenser, and means in said second circuit for impressing information upon said medium in response to impulses received on said input.

2. A pulse recording system including a recording medium and a medium transport mechanism, comprising a controlled rectifier, means for impressing input signal pulses upon said controlled rectifier, a condenser connected to the output of said rectifier, a circuit connected to said condenser, said condenser circuit including means for actuating said transport mechanism, and means for impressing information upon said medium, said actuating and impressing means operating in response to said input signal pulses.

3. A system according to claim 2 wherein said information impressing means comprises a pair of electrodes between which said medium passes, said electrodes being connected in the condenser circuit.

4. A system according to claim 3, and further comprising a voltage dropping resistor connected across said electrodes.

5. A system according to claim 3, and further comprising a drive wheel, means for continuously rotating said drive wheel at constant speed, a pressure wheel movable in and out of engagement with said drive wheel to grasp and release the recording medium therebetween, a solenoid connected to said pressure wheel, said solenoid being connected in the condenser circuit, the actuation of said solenoid in response to said signal pulses causing said pressure wheel to cooperate with said drive wheel to move said medium, the deactivation of said solenoid causing said pressure wheel to retract and to release said medium.

6. A system according to claim 5, and further comprising a second condenser connected across said solenoid, said second condenser causing said solenoid to remain energized for an extended period of time after receipt of a signal pulse, and a diode connected between said solenoid and said first mentioned condenser for preventing said second condenser from discharging.

7. A system according to claim 6, and further comprising a potentiometer connected across said second condenser, said potentiometer being adjustable to determine the time during which said solenoid remains energized.

8. A recording system including a recording medium and a medium transport mechanism, comprising a pair of input terminals for receiving signal pulses, a power supply, a transformer connected to said power supply, a controlled rectifier including an anode, a cathode and a gate, one of said terminals connected to said cathode, the other of said terminals connected to said gate, said anode being connected to the secondary winding of said transformer, a condenser connected between said cathode and the center tap of said secondary winding, a circuit connected to said condenser, said condenser circuit including means for actuating said transport mechanism, and means for impressing information upon said medium, said actuating and impressing operations taking place simultaneously in response to the pulses impressed upon said terminals which cause the firing of said rectifier.

9. A recording system including a recording medium and a medium transport mechanism, comprising a pair of input terminals for receiving signal pulses, a power supply, a transformer connected to said power supply, a controlled rectifier including an anode, a cathode and a gate, one of said terminals connected to said cathode, the other of said terminals connected to said gate, said anode being connected to both ends of the secondary winding of said transformer, a diode connected between each end of said secondary winding and said anode, a condenser connected between said cathode and the center tap of said secondary winding, a circuit connected to said condenser, said condenser circuit including means for actuating said transport mechanism, and means for impressing information upon said medium, said actuating and impressing operations taking place simultaneously in response to the pulses impressed upon said terminals which cause the firing of said rectifier.

10. A recording system according to claim 9 wherein said controlled rectifier constitutes a silicon containing, semiconductor device which is operative as a high current, high voltage, high efficiency switch.

11. A recording system according to claim 9, and further comprising a continuously rotating, constant speed motor connected to said power supply, a drive wheel connected to and operated by said motor, the perimeter of said drive wheel being located on one side of said recording medium, a pressure wheel positioned opposite said drive wheel on the other side of said medium, said pressure wheel being normally retracted from said medium, a solenoid connected in said condenser circuit and operative upon said pressure wheel in response to said pulses to cause said pressure wheel to be urged against said drive wheel to move said medium positioned therebetween.

12. A recording system according to claim 11, and further comprising a second condenser connected across said solenoid and a potentiometer connected to said condenser, said potentiometer being adjustable to determine the time during which said second condenser maintains said solenoid in an actuated condition.

13. A recording system according to claim 9 wherein said medium constitutes electrosensitive tape and a pair of electrodes located on opposite sides of said tape, said electrodes being connected in said condenser circuit whereby the circuit between said electrodes is closed in response to said pulses which are recorded on said tape.

14. A recording system according to claim 13, and further comprising a voltage dropping resistor connected across said electrodes.

15. A recording system according to claim 9 wherein the actuating means for said transport mechanism comprises a continuously rotating, constant speed motor, gripping means for causing said transport medium to advance past said information impressing means, fast acting clutch means connected between said motor and said gripping means, said clutch means being connected to the condenser circuit and operative in response to said pulses to cause said gripping means to become operative upon said medium.

References Cited by the Examiner
UNITED STATES PATENTS

| | | | |
|---|---|---|---|
| 1,913,200 | 6/33 | Hathaway | 346—109 X |
| 2,830,867 | 4/58 | Kohn et al. | 346—74 |
| 3,111,656 | 11/63 | Barrett et al. | 346—33 |

IRVING L. SRAGOW, *Primary Examiner.*